Sept. 1, 1959 R. O. SOFFEL 2,902,656

VARIABLE-FREQUENCY OSCILLATOR

Filed April 30, 1956

INVENTOR
R. O. SOFFEL
BY R. B. Ardis
ATTORNEY

United States Patent Office 2,902,656

Patented Sept. 1, 1959

2,902,656

VARIABLE-FREQUENCY OSCILLATOR

Robert O. Soffel, Hastings on Hudson, N.Y., assignor to Bell Telephone Laboratories, Incorporated, New York, N.Y., a corporation of New York Application April 30, 1956, Serial No. 581,454

3 Claims. (Cl. 331—135)

Figure 1:
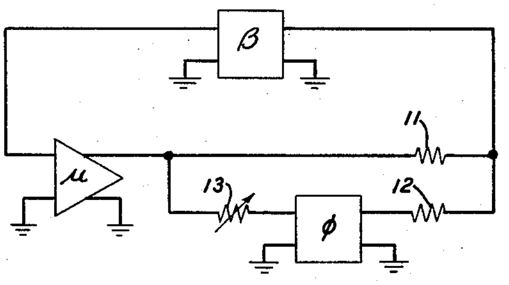

This invention relates generally to oscillator circuits and more particularly, although in its broader aspects not exclusively, to oscillator circuits which may be varied in frequency under the control of an external signal.

The principal object of the invention is to avoid any necessity for the use of special reactance tubes in varying the frequency of an oscillator circuit under the control of an external signal.

Another and more particular object is to increase the accuracy with which the frequency of an oscillator can be controlled by an external signal without the use of special reactance tubes.

Still another object is to control the operating frequency of an oscillator by varying a transmission magnitude rather than a circuit element phase.

In the past, whenever it has been necessary to vary the frequency of an oscillator under the control of an external signal, whether for the purpose of generating a frequency-modulated wave or for the purpose of automatic frequency control, it has been customary to connect a reactance tube as part of the tank circuit of the oscillator and vary the reactance presented by the tube, and hence the resonant frequency of the tank circuit, by applying the frequency-controlling signal to one of the grids of the reactance tube. While such arrangements are capable of extremely accurate frequency control over relatively wide frequency ranges, they do usually have the disadvantage of requiring special multigrid tubes to provide the signal-controlled variable reactance.

In accordance with a principal feature of the invention, the phase around the feedback loop of a feedback oscillator circuit is varied by providing a summing network in the feedback loop, splitting the portion of the feedback loop just preceding the summing network into two circuit paths having different phase shifts, each circuit path providing a different summing network input, and varying the magnitude of the transmission through one of the two circuit paths feeding the summing network. The summing network combines the transmissions for the two circuit paths into a single resultant wave which shifts phase as the transmission from the one path is varied in magnitude. As the phase at the summing network changes, the total phase shift around the feedback loop of the oscillator also changes, forcing the oscillation frequency to adjust itself until the total phase shift around the feedback loop is again zero, which is the condition for oscillation. Since the magnitude of the transmission through one of the two circuit paths supplying the summing network may readily be varied under the control of an external signal, the present invention permits the operating frequency of a feedback oscillator to be controlled with extreme accuracy over a relatively wide range of frequencies with no need for any use of a special multigrid reactance tube.

Many important embodiments of the invention feature the use of an additional amplifier in one of the two feedback-loop circuit paths feeding the summing network.

In accordance with this feature of the invention, the gain of the additional amplifier is varied under the control of the external signal, thus changing the transmission through the selected path in the manner described and shifting the total phase shift around the oscillator feedback loop. Since the additional amplifier need only be a simple amplifier stage, extremely close frequency control over a wide range of frequencies is obtained, still with no need of a special multigrid reactance tube.

An important subcombination featured by the invention is the phase-shifting network formed by a summing network and two separate circuit paths having different phase shifts connecting the phase-shifting network input circuit to respective summing network inputs. Transmission through one of the circuit paths is varied in the manner described, causing the phase of the resultant wave at the summing network output to change. Such a network finds ready application wherever the phase shift imposed by a four-terminal network needs to be varied under the control of an external signal.

Figure 2:
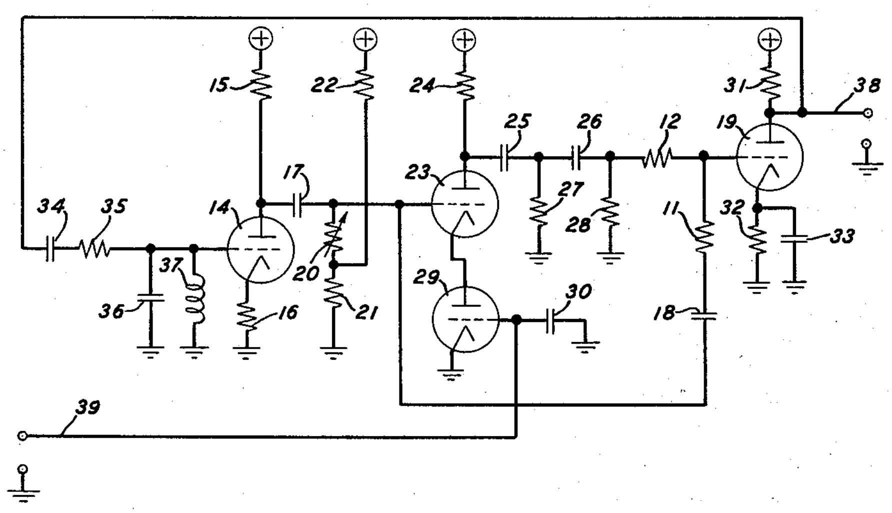
Figure 3A:
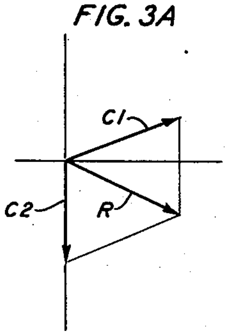
Figure 3B:
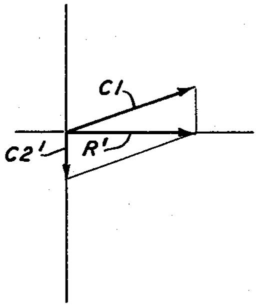
Figure 3C:
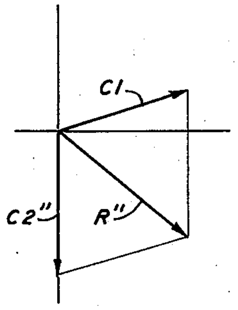

A more complete understanding of the invention may be obtained from a study of the following detailed description of both a generalized and a specific embodiment. In the drawings:

Fig. 1 is a block diagram illustrating an embodiment of the invention in which the oscillation frequency is varied under the control of a variable resistance in one branch of the oscillator feedback path;

Fig. 2 is a schematic diagram showing a specific embodiment of the invention in which the oscillation frequency is varied by changing the gain of an amplifier in one branch of the oscillator feedback path; and Figs. 3A, 3B, and 3C are vector diagrams illustrating the manner in which phase shift is changed in accordance with the invention by varying the magnitude of the transmission in one of two eventually-combined circuit branches having different phase shifts.

The generalized embodiment of the invention shown in Fig. 1 includes an amplifier $\mu$ and a frequency-determining feedback path $\beta$ interconnecting the input and output circuits of amplifier $\mu$. The total phase shift around the feedback loop is zero, permitting the circuit to generate sustained oscillations. Thus far, the circuit is the same as any other fixed-frequency feedback oscillator. In accordance with the invention, however, the illustrated oscillator is made variable in frequency by the inclusion in the feedback loop of a summing network composed of a pair of resistors 11 and 12 and by the addition of a fixed phase-shifting network $\varphi$ and a variable resistor 13. Resistors 11 and 12 form an ordinary resistance summing-network, with the junction point between them forming the summing-network output and their ends remote from the junction point the summing-network inputs. In accordance with an important feature of the invention, the portion of the feedback loop between the output side of amplifier $\mu$ and the two summing-network inputs is composed of two separate circuit paths. The first of these circuit paths goes directly from the output of amplifier $\mu$ to summing resistor 11, while the second goes from the output of amplifier $\mu$ through variable resistor 13 and fixed phase-shifting network $\varphi$ to summing resistor 12. The oscillator output may be taken at any convenient point in the feedback loop.

In the embodiment of the invention illustrated in block diagram form in Fig. 1, the operating frequency of the oscillator is accurately variable over a relatively wide range of frequencies under the control of the setting of variable resistor 13. Although it may be greater or less if desired, the phase difference between the two circuit paths is preferably somewhere between the limits of 90 and 135 degrees in order to give the greatest control over the operating frequency with the least change in magnitude of the gain around the feedback loop. The phase shift through the circuit path leading to summing resistor 11, on the other hand, is substantially zero. The waves in the two paths leading to summing resistors 11 and 12 may, therefore, be thought of as two vectors which are displaced from one another in phase by a predetermined angle. They add vectorially in the summing network.

In accordance with an important feature of the invention, the magnitude of the transmission through the circuit path including summing resistor 12, and hence the magnitude of the corresponding vector, is varied under the control of the resistance setting of variable resistor 13. As the magnitude of this vector varies, the phase of the resultant of the two vectors changes. As the phase of the resultant changes, the total phase shift around the oscillator feedback loop changes by a like amount, forcing the oscillation frequency to adjust itself until the total phase shift is restored to zero. In this manner, the oscillation frequency is accurately controlled over a wide frequency range by a simple resistance setting, eliminating any need for either a variable reactance element or a special multi-grid reactance tube.

The embodiment of the invention shown in schematic form in Fig. 2 is generally similar to that shown in block diagram form in Fig. 1 but, instead of relying upon a simple variable resistor to control the operating frequency of the oscillator, includes means for varying the oscillation frequency under the control of an external signal. The controlling means, however, still avoids the use of either variable reactance elements or special multigrid reactance tubes.

In the variable-frequency oscillator illustrated in Fig. 2, amplification is provided in two stages. The first stage includes a triode vacuum tube 14 having its anode connected through an anode resistor 15 to a source of positive anode-potential and its cathode returned to ground through a cathode resistor 16. The anode of tube 14 is connected through the series combination of a first coupling capacitor 17 and a second coupling capacitor 18 to one end of summing resistor 11. Summing resistors 11 and 12 form a standard resistance summing-network as in Fig. 1 and have their common point connected to the control grid of a triode vacuum tube 19. A small amount of phase shift is provided between amplifier tubes 14 and 19 by a network composed of coupling capacitor 17, a variable resistor 20, and a pair of fixed resistors 21 and 22. Resistors 20 and 21 are connected in series between the side of capacitor 17 remote from the anode of tube 14 and ground, and resistor 22 is connected to the positive anode-supply voltage from the junction between variable resistor 20 and fixed resistor 21. Variable resistor 20 affords a fine adjustment of the phase shift around the oscillator feedback loop and, hence, of the nominal operating frequency of the oscillator.

In a manner similar to that shown in Fig. 1, the embodiment of the invention illustrated in Fig. 2 contains in its feedback loop a resistance summing-network composed of resistors 11 and 12 and a pair of separate and distinct circuit paths between the gain-producing section of the oscillator and the respective summing-network input leads. The connection through coupling capacitor 18 to summing resistor 11 constitutes one of these circuit paths. The remaining path differs somewhat from that shown in block diagram form in Fig. 1 in that, instead of a simple variable resistor, it contains means for varying the amplification of waves passing through the path under the control of an external signal.

The second circuit path in the principal phase-shifting network in the embodiment of the invention shown in Fig. 2, includes a first triode vacuum tube 23 having its control grid connected to the junction between coupling capacitors 17 and 18 and its anode connected through an anode resistor 24 to the positive anode-supply source. The anode of tube 23 is connected to summing resistor 12 through a fixed phase-shifting network which is made up of a pair of series capacitors 25 and 26 and a pair of shunt resistors 27 and 28. Capacitors 25 and 26 form a series path between the anode of tube 23 and summing resistor 12, resistor 27 is returned to ground from the junction of capacitors 25 and 26, and resistor 28 is returned to ground from the junction of capacitor 26 and summing resistor 12.

The gain through tube 23, and hence the magnitude of the transmission through the circuit path to summing resistor 12, is controlled by means of a second triode vacuum tube 29 having its anode connected to the cathode of tube 23. The cathode of tube 29 is grounded, and the control grid is connected to ground through a bypass capacitor 30.

In the main feedback path of the oscillator in the embodiment of the invention illustrated in Fig. 2, the anode of tube 19 is connected through an anode resistor 31 to the positive anode-supply source and the cathode is returned to ground through a cathode resistor 32. Cathode resistor 32 is, in turn, bypassed by a capacitor 33. The anode of tube 19 is connected through the series combination of a coupling capacitor 34 and a resistor 35 to the control grid of tube 14. A tank circuit composed of a parallel capacitor 36 and inductor 37 is connected between the control grid of tube 14 and ground. The output of the oscillator is taken from the anode of tube 19 through an output line 38, and the external frequency-control signal is applied to the control grid of tube 29 through an input line 39.

The portion of the circuit in Fig. 2 composed of tubes 14 and 19 is capable of operating independently as an oscillator at a frequency determined largely by the resonant frequency of tank circuit 36—37 and the phase shift introduced by capacitor 17 and resistors 20, 21, and 22. From any point in the feedback loop, the total phase shift around the loop and back to that point is zero (or 360 degrees, depending upon the point of view). Tube 23 acts, however, to insert another component into the feedback loop. The output of tube 14 drives tube 23 as an amplifier. Tube 23, however, has tube 29 connected in its cathode circuit as a source of variable impedance. A change in the voltage at the control grid of tube 29 changes the plate resistance of tube 29 and, hence, the gain of tube 23. The output of tube 23 undergoes a phase shift in its fundamental through capacitors 25 and 26 and resistors 27 and 28. This phase-shifted wave is added through resistor 12 into the feedback loop.

As a result of changes in the potential at the control grid of tube 29, the magnitude of the phase-shifted wave added through resistor 12 is changed, causing the phase of the wave driving the oscillator tank circuit also to change. It is fundamental in a feedback oscillator, however, that the net phase-shift around the oscillating loop must be zero. When changes in the signal at the control grid of tube 29 cause this net phase-shift to depart from zero, the frequency changes in order to permit the tank circuit to insert a canceling phase-shift, the amount of the change depending upon the amount of the change in the grid bias of tube 29.

An important subcombination featured by the invention is the variable phase-shifting network used in the embodiments of the invention shown in Figs. 1 and 2. In Fig. 1, this subcombination includes the summing network formed by resistors 11 and 12, the circuit path from amplifier $\mu$ to summing resistor 11, and the circuit path from the amplifier $\mu$ through variable resistor 13, and fixed phase-shifting network $\varphi$ to summing resistor 12. In Fig. 2 it includes the summing network made up of resistors 11 and 12, the circuit path through capacitor 18 to summing resistor 11, and the circuit path including tube 23 through the fixed phase-shifting network to summing resistor 12. Its operation, while already described in connection with Figs. 1 and 2, may be visualized still more accurately with the aid of Figs. 3A, 3B, and 3C. The following description, it should be noted, is for fixed frequency operation, i.e., for operation with the feedback loop in Fig. 2 opened at some point.

Fig. 3A illustrates the vector addition of the two component waves in summing network 11—12 in Fig. 2. The vector C1 represents the component passed directly from tube 14 through capacitor 18 to summing resistor 11. The vector C2, on the other hand, represents the component passed through amplifier tube 23 and the fixed phase-shifting network to summing resistor 12. With no frequency-changing signal on the grid of tube 29, the magnitude of vector C2 and the phase of the resultant vector R are as illustrated.

Figs. 3B and 3C illustrate the vector addition of the same two components with different frequency-correcting signals at the grid of tube 29. Fig. 3B illustrates the situation which exists when the incoming signal makes the grid of tube 29 more negative. The anode current of tube 29 is decreased, increasing the plate resistance. The increased resistance in the cathode circuit of tube 23 increases the negative feedback and reduces the gain of the tube and, hence, the transmission to summing resistor 12. The vector C2′ in Fig. 3B is thus shorter than vector C2 in Fig. 3A although of the same phase. The resultant R′, however, has a new and, relative to that of resultant vector R, larger phase angle (measured counterclockwise from zero). In a similar manner, Fig. 3C illustrates what happens when the incoming signal makes the grid of tube 29 less negative. The anode current of tube 29 increases, decreasing the plate resistance of tube 29. The reduced resistance in the cathode circuit of tube 23 reduces the negative feedback, resulting in an increased gain. The vector C2″ in Fig. 3C is thus larger than vector C2 in Fig. 3A and resultant vector R″ has a phase angle smaller than that of resultant vector R.

It is to be understood that the above described arrangements are illustrative of the application of the principles of the invention. Numerous other arrangements may be devised by those skilled in the art without departing from the spirit and scope of the invention.

What is claimed is:

1. An oscillator which comprises an amplifier having an input circuit and an output circuit, a feedback path connected to supply alternating-current energy of a predetermined oscillation frequency from said amplifier output circuit to said amplifier input circuit in phase with the alternating-current energy in said amplifier input circuit, and means to vary said oscillation frequency under the control of an external signal which comprises a summing network in said feedback path having a single output circuit and a pair of input circuits, a first circuit path comprising passive elements only included in said feedback path between said amplifier output circuit and one of said summing network input circuits, a pair of amplifying devices each including a current-emissive electrode, a current-receiving electrode, and a control electrode for current passing between said current-emissive and current-receiving electrodes, a connection between said amplifier output circuit and the control electrode of a first of said amplifying devices, a fixed phase-shifting network connected between the current-receiving electrode of said first amplifying device and the other of said summing network input circuits, said first amplifying device and said fixed phase-shifting network forming a second circuit path in said feedback path between said amplifier output circuit and said other of said summing network input circuits, a direct-current connection between the current-emissive electrode of said first amplifying device and the current-receiving electrode of the second of said amplifying devices, a direct-current connection between the current-emissive electrode of said second amplifying device and a point of fixed reference potential, and means to vary the potential of the control electrode of said second amplifying device under the control of said external signal.

2. In the feedback path of an oscillator, means for varying the frequency of said oscillator under the control of an external signal comprising an input circuit, an output circuit, a summing network having two input terminals and one output terminal, means connecting said summing network output terminal to said output circuit, a first circuit path comprising passive elements only connected between said input circuit and one of said summing network input terminals, an amplifier having an input terminal, an output terminal and a controllable negative feedback element, means connecting said amplifier input terminal to said input circuit, a fixed phase-shifting network having input and output terminals, means connecting said amplifier output terminal to said phase-shifting network input terminal, means connecting said phase-shifting network output terminal to the remaining one of said summing network input terminals so that said amplifier and said phase-shifting network form a second circuit path between said input circuit and said summing network, and means responsive to said external signal for controlling said amplifier negative feedback element.

3. Apparatus in accordance with claim 2 wherein said amplifying device comprises a first vacuum tube having cathode, grid and plate and wherein said negative feedback element comprises a second vacuum tube having cathode, grid and plate electrodes, said cathode and plate electrodes being connected between said first vacuum tube cathode and a point of reference potential so that the potential between said second vacuum tube grid electrode and said point of reference potential determines the degenerative effectiveness of said element.

References Cited in the file of this patent

UNITED STATES PATENTS

| | | |
|---|---|---|
| 2,321,269 | Artzt | June 8, 1943 |
| 2,441,567 | Darlington | May 18, 1948 |
| 2,623,945 | Wigan | Dec. 30, 1952 |
| 2,749,441 | Kelly | June 5, 1956 |
| 2,777,951 | Charlton | Jan. 15, 1957 |

OTHER REFERENCES

"Frequency Modulated Oscillator," by De Lange in Proceedings of the I.R.E., vol. 37, No. 11, pp. 1328–1330, November 1949.